(12) United States Patent
Demers (10) Patent No.: US 11,878,755 B2
(45) Date of Patent: Jan. 23, 2024

(54) SUPPORT STAND FOR TWO-WHEELED VEHICLE

(71) Applicant: Guy Demers, Dorval (CA)

(72) Inventor: Guy Demers, Dorval (CA)

( * ) Notice: Subject to any disclaimer, the term of this patent is extended or adjusted under 35 U.S.C. 154(b) by 203 days.

(21) Appl. No.: 17/617,842

(22) PCT Filed: Jul. 14, 2020

(86) PCT No.: PCT/CA2020/000086
§ 371 (c)(1),
(2) Date: Dec. 9, 2021

(87) PCT Pub. No.: WO2021/012032
PCT Pub. Date: Jan. 28, 2021

(65) Prior Publication Data
US 2023/0322316 A1     Oct. 12, 2023

(30) Foreign Application Priority Data

Jul. 19, 2019   (GB) .................................... 1910420

(51) Int. Cl.
*B62H 3/08*    (2006.01)
(52) U.S. Cl.
CPC ...................... *B62H 3/08* (2013.01)
(58) Field of Classification Search
CPC ................................. B62H 3/08; B62H 3/06
USPC .................................................. 211/23, 24
See application file for complete search history.

(56) References Cited

U.S. PATENT DOCUMENTS

| | | | | |
|---|---|---|---|---|
| 446,835 A | * | 2/1891 | Kennedy | B62H 3/08 211/20 |
| 519,016 A | | 5/1894 | De Clairmont | |
| 529,939 A | * | 11/1894 | Noderer | B62H 3/08 211/20 |
| 556,789 A | * | 3/1896 | Walker | B62H 3/08 211/20 |
| 556,806 A | * | 3/1896 | Chandler | B62H 3/04 211/20 |
| 562,669 A | * | 6/1896 | Smart | B62H 3/08 211/20 |
| 1,233,454 A | * | 7/1917 | Dietsche | A47F 7/04 211/24 |
| 1,301,797 A | * | 4/1919 | Ziegler | A47F 7/04 211/24 |
| 1,406,296 A | * | 2/1922 | Stewart | A47F 7/04 211/24 |
| 1,682,660 A | * | 8/1928 | Burke | A47F 7/04 211/24 |

(Continued)

FOREIGN PATENT DOCUMENTS

| AT | 516013 B1 | * | 5/2016 | ............... B62H 3/00 |
|---|---|---|---|---|
| CA | 2507984 A1 | * | 11/2006 | ............... B62H 3/04 |

(Continued)

*Primary Examiner* — Stanton L Krycinski (57) ABSTRACT

A support stand (100) for supporting a two-wheeled vehicle (500) though a support wheel (502) thereof. The support stand defines a wheel cradle (125) for receiving the support wheel (502) thereinto. The support stand (500) is made of substantially plate-shaped elements (104, 106, 116, 130) that are securable to each other and detachable from each other by toolless connection arrangements (114, 120, 128, 134) of mechanical interferences.

20 Claims, 8 Drawing Sheets

(56) References Cited

U.S. PATENT DOCUMENTS

| | | | |
|---|---|---|---|
| 1,682,745 A * | 9/1928 | Ferguson | A47F 7/04 |
| | | | 211/24 |
| 1,714,023 A * | 5/1929 | Harley | A47F 7/04 |
| | | | 211/24 |
| 2,100,077 A * | 11/1937 | Harrison | A47F 7/04 |
| | | | 248/173 |
| 2,609,091 A | 9/1952 | Rothe et al. | |
| 3,348,697 A * | 10/1967 | Saunders | B62H 3/06 |
| | | | 211/22 |
| 3,510,007 A * | 5/1970 | Rademacher | A47F 7/04 |
| | | | 211/24 |
| 5,259,578 A * | 11/1993 | Jones | A47C 5/005 |
| | | | 297/440.13 |
| 5,301,817 A | 4/1994 | Merritt | |
| 5,735,410 A | 4/1998 | Kallstrom | |
| 5,988,402 A | 11/1999 | Mayfield | |
| 6,241,104 B1 | 6/2001 | Kraus | |
| 6,640,979 B1 | 11/2003 | Mayfield | |
| 6,755,599 B1 | 6/2004 | Plyler | |
| 6,866,282 B2 | 3/2005 | Heerspink | |
| D507,226 S | 7/2005 | Oksa | |
| 7,150,359 B1 * | 12/2006 | Lyons | B62H 3/08 |
| | | | 211/20 |
| D605,092 S | 12/2009 | Van Buuren | |
| 8,485,369 B2 | 7/2013 | Glover | |
| 8,851,301 B1 * | 10/2014 | Ho | B62H 3/10 |
| | | | 211/20 |
| 9,409,508 B2 | 8/2016 | Graham | |
| 9,981,706 B2 * | 5/2018 | Van Straaten | B62H 3/02 |
| 10,059,247 B1 * | 8/2018 | Bley | B60P 3/122 |
| 10,179,620 B2 * | 1/2019 | Hyde | B62H 3/08 |
| 10,618,582 B1 * | 4/2020 | Liu | B62H 3/06 |
| 10,807,665 B1 * | 10/2020 | Ybarra, Jr. | B62H 3/10 |
| 10,850,784 B1 * | 12/2020 | Hamilton | B62H 3/08 |
| 11,008,060 B1 * | 5/2021 | Liu | B62H 3/10 |
| 11,021,139 B2 * | 6/2021 | Krolski | B62H 3/04 |
| 11,299,225 B1 * | 4/2022 | DeBaker | B62H 3/08 |
| 2006/0108297 A1 | 5/2006 | Gay | |
| 2007/0017882 A1 | 1/2007 | Lewis | |
| 2009/0001031 A1 | 1/2009 | Hutchinson, II | |
| 2011/0233154 A1 | 9/2011 | St Louis | |
| 2014/0183147 A1 * | 7/2014 | Chiu | B60R 9/10 |
| | | | 211/17 |
| 2017/0120974 A1 * | 5/2017 | Peruzzo | B62H 3/06 |
| 2019/0015965 A1 * | 1/2019 | Nardi | B62H 3/08 |
| 2020/0324840 A1 * | 10/2020 | Maxfield | B62H 3/06 |

FOREIGN PATENT DOCUMENTS

| | | | | |
|---|---|---|---|---|
| CA | 2729670 | | 1/2010 | |
| CA | 2954699 | | 1/2016 | |
| CN | 201296310 | | 8/2009 | |
| CN | 101200203 | | 8/2011 | |
| CN | 103043139 | | 4/2013 | |
| CN | 20375328 | | 8/2014 | |
| CN | 203753281 | | 8/2014 | |
| DE | 202004017494 | | 4/2005 | |
| DE | 202018004771 U1 * | 12/2018 | | B62H 3/04 |
| DE | 202019003504 U1 * | 11/2019 | | |
| DE | 102019002282 A1 * | 10/2020 | | |
| DE | 102019107493 A1 * | 10/2020 | | |
| DE | 102019108229 A1 * | 10/2020 | | B60S 3/041 |
| GB | 2277722 | | 11/1994 | |
| GB | 2394928 | | 5/2004 | |
| GB | 2557586 A * | 6/2018 | | B62H 3/08 |
| GB | 2574217 A * | 12/2019 | | B62H 3/06 |
| JP | 2010149810 | | 7/2010 | |
| JP | 2011093506 | | 5/2011 | |
| JP | 2013100070 | | 5/2013 | |
| KR | 20090012777 U * | 12/2009 | | |
| KR | 201102427 | | 3/2011 | |
| WO | 2011141694 | | 11/2011 | |
| WO | WO-2011146996 A1 * | 12/2011 | | B62H 3/04 |

\* cited by examiner

SUPPORT STAND FOR TWO-WHEELED VEHICLE

FIELD OF THE INVENTION

The present invention relates generally to support stands for vehicles and, more particularly, to a dismountable support stand usable for supporting in an upright attitude a two-wheeled vehicle such as, for example, a motorcycle, a scooter, or a light-weight bicycle, and a method of assembling same.

BACKGROUND

Support stands for two-wheeled vehicles are typically used to support the two-wheeled vehicle in a substantially upright attitude. Conventional support stands designed for mid-sized to large motorcycyles are typically relatively heavy. Also, when they can be disassembled, such support stands usually include at least one relatively large component that cannot be further disassembled, which prevents compact storage for shipping or when carrying the support stand for use at an alternate location. Furthermore, the assembly of such support stands is typically a relatively long process, and some include heavy metal members.

Another problem with existing support stand is that they are typically not adjustable to the width of the tire of the supported vehicle. Therefore, for some common tires widths, a motorcycle having its front or rear wheel engaged in such support stands may lean slightly sideward because of a lose engagement between the tire and the support stand, which creates an instability and therefore risks of having the motorcycle fall on its side, with the associated risks of damaging the motorcycle.

Against this background, there exists a need in the industry to provide improved support stands. An object of the present invention is therefore to provide such a support stand.

SUMMARY OF THE INVENTION

In a broad aspect, there is provided a support stand for a two-wheeled vehicle, one wheel of the two-wheeled vehicle being a support wheel, the support stand being positionable on a support surface for supporting the two-wheeled vehicle substantially vertically by engaging the support wheel and maintaining the support wheel substantially vertical, the support stand defining a stand longitudinal axis, the support stand comprising: a front element defining a front element central portion and a pair of front element lateral portions extending laterally outwardly therefrom; a bottom element defining longitudinally opposed bottom element forward and rearward edge portions and laterally opposed bottom element side edge portions extending between the bottom element forward and rearward edge portions, the bottom element defining a wheel support surface between the bottom element forward and rearward edge portions, the bottom element forward edge portion being removably engaged with the front element central portion through a first connection arrangement so as to be supported above the support surface spaced apart therefrom; first and second side elements provided in a laterally spaced apart relationship relative to each other and extending rearwardly from the front element, the first and second side elements each defining a respective side element forward edge portion removably engaged with the front element central portion through a second connection arrangement and a respective side element lower edge portion removably engaged with a respective one of the bottom element side edge portions through a respective third connection arrangement; and a ramp element extending substantially longitudinally and rearwardly relative to the bottom element, the ramp element defining a ramp element forward edge portion and a longitudinally opposed ramp element rearward edge portion, the ramp element rearward edge portion being sized and configured for abutting against the support surface, the ramp element forward edge portion being removably engaged with the side element lower edge portion through a fourth connection arrangement. The front element, bottom element and first and second side elements cooperatively form a wheel cradle opened upwardly and rearwardly for receiving in a forward rolling movement the support wheel. Also, the first, second, third and fourth connection arrangements are toolless connection arrangements in which the front, first side, second side, bottom and ramp elements are secured to each other by mechanical interferences.

There may also be provided a support stand wherein the mechanical interferences are devoid of fasteners.

There may also be provided a support stand wherein the front, bottom, first side, second side and ramp elements are substantially planar plate-shaped.

There may also be provided a support stand wherein the first and second side elements are securable to the front element at a plurality of different laterally spaced apart distances from each other.

There may also be provided a support stand wherein the second connection arrangement includes at least two substantially parallel and vertical second connection slots formed in the front element central portion at laterally spaced apart locations from each other and a substantially vertical second connection protrusion defined by the side elements forward edge portion, the second connection protrusion being selectively and alternatively insertable in each of the second connection slots substantially snugly so that when the second connection protrusion is inserted in one of the second connection slots, the side element forward edge portion is laterally static relative to the front element.

There may also be provided a support stand wherein the first and second side elements are mirror images of each other, and wherein the second connection protrusion is laterally asymmetrically configured relative to the first and second side elements so that switching the first and second side elements with each other while using the same second connection slots to attach the first and second side elements to the front element results in a change in spacing between the first and second side elements.

There may also be provided a support stand wherein the second connection protrusions are thinner than the remainder of the first and second side element frontward edge portions and laterally offset relative to a midplane of the first and second side element frontward edge portions.

There may also be provided a support stand wherein the second connection arrangement includes at least two substantially parallel and vertical second connection slots pairs formed in the front element central portion at laterally spaced apart locations from each other, the second connection slots pairs each including two vertically spaced apart second connection slots, the second connection arrangement further including a pair of substantially vertical second connection protrusion defined by the side elements forward edge portion substantially vertically spaced apart from each other, the second connection protrusions being selectively and alternatively insertable in each of the second connection slot pairs substantially snugly so that when the second connection protrusions is inserted in the second connection slots, the side element forward edge portion is laterally static relative to the front element.

There may also be provided a support stand wherein the first, second, third and fourth connection arrangements are configured and sized to that the bottom element and the first and second side elements are substantially stably supported in a spaced apart relationship above the support surface through the front element lateral portions and the ramp element rearward edge portion when the support stand is operationally positioned over the support surface.

There may also be provided a support stand wherein the ramp element rearward edge portion protrudes laterally outwardly relative to the first and second side elements and defines a pair of laterally spaced apart ramp element feet portions for supporting the support stand on the support surface.

There may also be provided a support stand further comprising a pair of foot elements each mountable to a respective one of the front element lateral portions for supporting the front element on the support surface through a toolless fifth connection arrangement.

There may also be provided a support stand wherein the foot elements are substantially planar plate-shaped, the fifth connection arrangement including a fifth connection arrangement recess provided at a front element bottom edge portion of the front element and receiving part of one of the foot elements therein, the front element lateral portion being supported on top of the foot element.

There may also be provided a support stand wherein the fourth connection arrangement includes a fourth connection arrangement recess provided in the side element bottom edge portion, the fourth connection arrangement recess receiving part of the ramp element therein, the first and second side elements being in part supported on top of the ramp element.

There may also be provided a support stand wherein the first and second side elements are substantially L-shaped and define a substantially vertical side element forward portion defining the side element forward edge portion and a side element rear end portion extending rearwardly from a bottom portion of the side element forward portion, the ramp element being secured to the side element rear end portions.

There may also be provided a support stand wherein the first connection arrangement includes a first connection protrusion extending from the bottom element forward edge portions engaged in a first connection aperture defined in the front element central portion.

There may also be provided a support stand wherein the third connection arrangement includes a third connection protrusion protruding downwardly from the side element lower edge portion engaged in a third connection aperture defined in and extending through one of the bottom element side edge portions.

There may also be provided a support stand wherein the third connection protrusion protrudes downwardly from the bottom element, the third connection protrusion defining a third connection protrusion aperture extending laterally therethrough, the third connection arrangement further comprising a lock pin extending through the third connection protrusion aperture and preventing removal of the the third connection protrusion from the third connection aperture.

There may also be provided a support stand wherein the ramp element defines an access ramp surface extending longitudinally centrally and substantially forwardly upwardly between the support surface and the wheel support surface of the bottom element, so as to cooperatively form a substantially continuous and longitudinally extending pathway surface to access the wheel cradle.

There may also be provided a support stand wherein further comprising a wheel stop extending between the first and second elements above the ramp.

There may also be provided a support stand wherein the wheel stop includes a pin received in recesses formed in the first and second side elements.

There may also be provided a support stand further comprising a front bracket and a rear bracket each securable to the support surface, the support stand being removably mountable to the front and rear brackets so that the support stand is immobilized relative to the front and rear brackets.

There may also be provided a support stand further comprising a width clamp adapted for user selectively applying oppositely inwardly directed pressure forces on the first and second side elements.

There may also be provided a support stand wherein the first and second side elements are substantially parallel to each other.

There may also be provided a support stand wherein the first and second side elements are angled at an angle of about 10 degrees relative to each other and converge towards each other in a direction leading towards the front element. In some embodiments, this angle is about 3 degrees.

In another broad aspect, there is provided a support stand for a two-wheeled vehicle, one wheel of the two-wheeled vehicle being a support wheel, the support stand being positionable on a support surface for supporting the two-wheeled vehicle substantially vertically by engaging the support wheel and maintaining the support wheel substantially vertical, the support stand defining a stand longitudinal axis, the support stand comprising: a front plate defining a front plate central portion and a pair of front plate lateral portions extending laterally outwardly therefrom; a bottom plate defining longitudinally opposed bottom plate forward and rearward edge portions and laterally opposed bottom plate side edge portions extending between the bottom plate forward and rearward edge portions, the bottom plate defining a wheel support surface between the bottom plate forward and rearward edge portions, the bottom plate forward edge portion being removably engaged with the front plate central portion through a first connection arrangement so as to be supported above the support surface spaced apart therefrom; first and second side plates provided in a laterally spaced apart relationship relative to each other and extending rearwardly from the front plate, the first and second side plates each defining a respective side plate forward edge portion removably engaged with the front plate central portion through a second connection arrangement and a respective side plate lower edge portion removably engaged with a respective one of the bottom plate side edge portions through a respective third connection arrangement; and a ramp plate extending substantially longitudinally and rearwardly relative to the bottom plate, the ramp plate defining a ramp plate forward edge portion and a longitudinally opposed ramp plate rearward edge portion, the ramp plate rearward edge portion being sized and configured for abutting against the support surface, the ramp plate forward edge portion being removably engaged with the side plate lower edge portion through a fourth connection arrangement. The front plate, bottom plate and first and second side plates cooperatively form a wheel cradle opened upwardly and rearwardly for receiving in a forward rolling movement the support wheel. Also, the first, second, third and fourth connection arrangements are toolless connection arrangements in which the front, first side, second side, bottom and ramp plates are secured to each other by mechanical interferences. All the characteristics of the first support stand described hereinabove also apply to this second stand.

In some embodiments, the proposed support stand may be completely assembled and disassembled by hand in relatively short period of time by a lone intended user. For example, some tests showed that such assembly may be performed in some embodiments in less than one minute. Furthermore, with the support stand assembled and resting on a substantially hard support surface, the two-wheeled vehicle may be operated such that its front or rear wheel is driven forwardly on the ramp element followed with engaging the wheel cradle, allowing easy engagement of the two-wheeled vehicle with the support stand. Hence the two-wheeled vehicle is rapidly and efficiently parked in a substantially stable upright attitude without the use of an additional means of support such as a deployable kick stand or the like.

Another advantage of the support stand resides in that, when in a disassembled state, in some embodiments, the substantially planar or plate-like configuration of each element of the support stand allows the elements to be piled coplanarly in a substantially compact configuration.

Thus, especially if a relatively light material is used to manufacture the support stand, such as aluminum, the support stand may be packaged in a relatively flat and light-weight parcel having a thickness of, for example, 10 cm or less, which is a non negligible economic aspect in a growing online purchasing market.

Another advantage of some embodiments of the support stand resides in that, without the use of a hand tool, those embodiments may be relatively easily and quickly readjusted by hand for compatibility with a relatively wide range of common standard tire widths. In some more specific embodiments, the width of the wheel cradle may be further fine adjusted to a user preferred level of friction engagement with the opposed sidewalls of the tire engaged therein.

Some embodiments of the proposed support stand are versatile as they are configurable, without the use of a hand tool and relatively easily and quickly, for installation on a hard floor or on a soft ground. In some embodiments, the support stand may be relatively easily and quickly engaged with, and removed from its floor brackets attached to the cargo floor of a pick-up truck, a trailer, or the likes.

The present application claims priority from UK Request for a Patent GB1910420.7 filed Jul. 19, 2019, the contents of which is hereby incorporated by reference in its entirety.

Other objects, advantages and features of the present invention will become more apparent upon reading of the following non-restrictive description of some embodiments thereof, given by way of example only with reference to the accompanying drawings.

DETAILED DESCRIPTION

The terms "substantially" and "about" are used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention.

Figure 1:
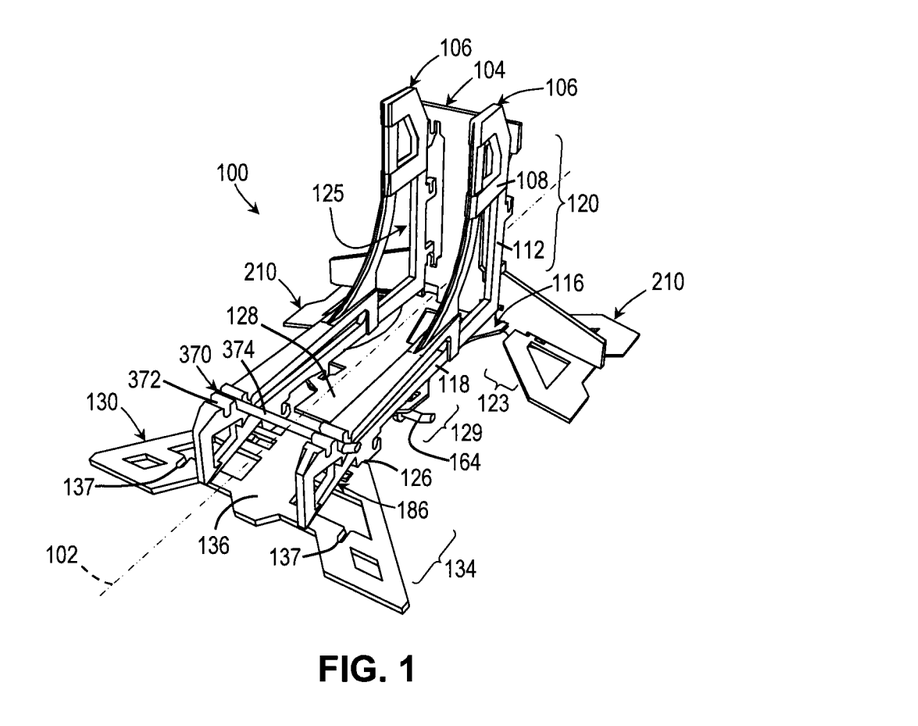
FIG. 1, in a rear perspective view, illustrates an embodiment of a support stand for a two-wheeled vehicle, according to an embodiment of the present invention.
Figure 2:
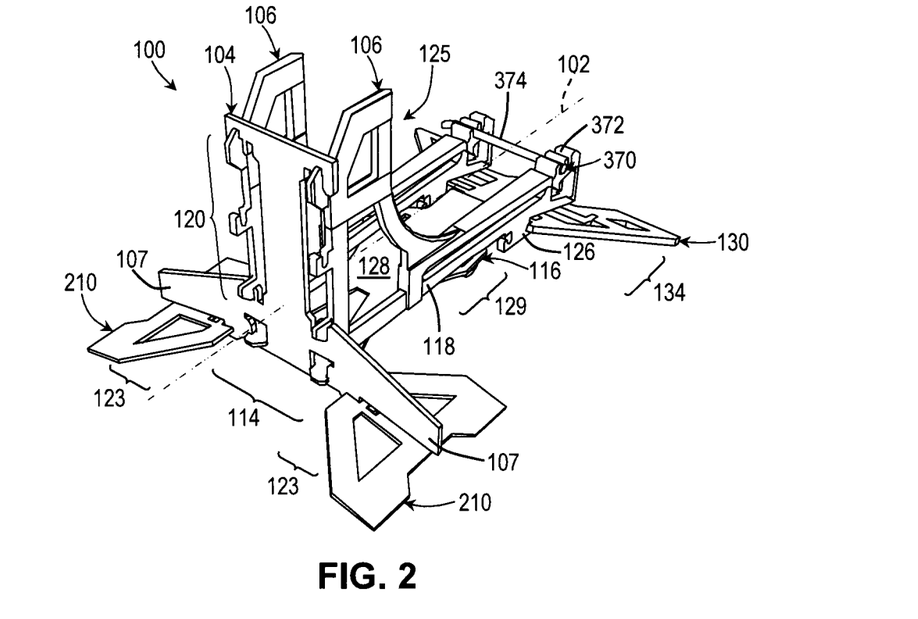
FIG. 2, in a front perspective view, illustrates the support stand of FIG. 1.
Figure 3:
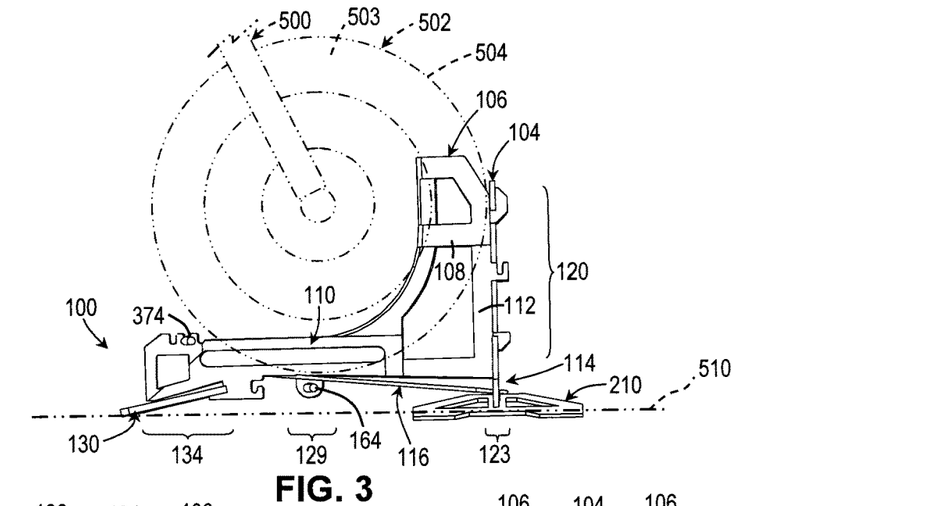
FIG. 3, in a side elevation view, illustrates the support stand of FIG. 1, with a motorcycle front wheel shown engaged thereto.
Figure 4:
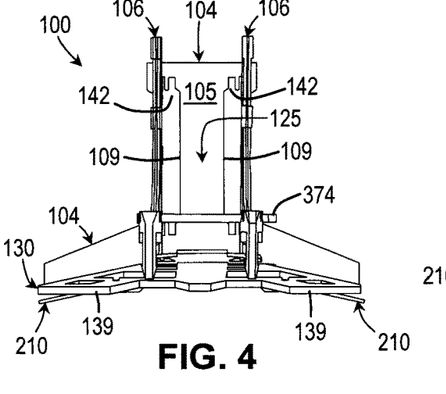
FIG. 4, in a rear elevation view, illustrates the support stand of FIG. 1.
Figure 5:
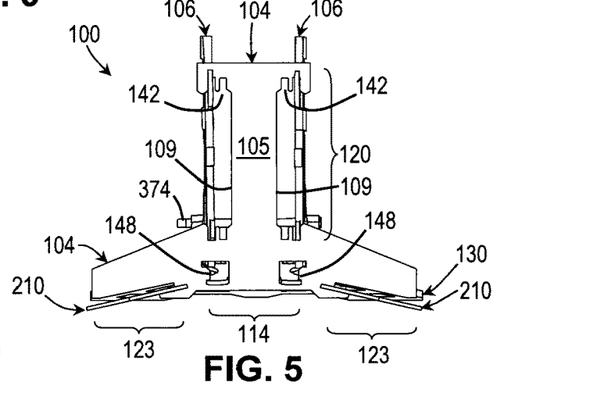
FIG. 5, in a front elevation view, illustrates the support stand of FIG. 1.
Figure 6:
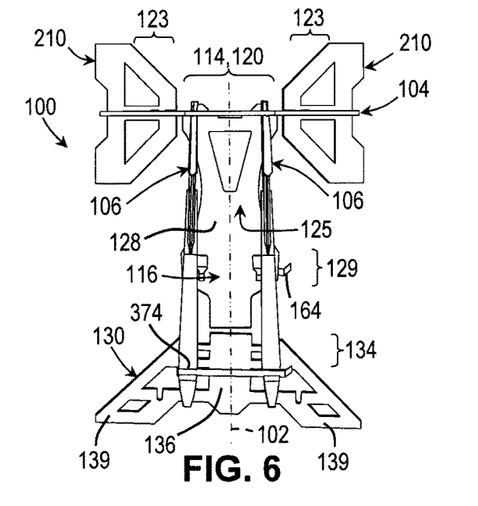
FIG. 6, in a top plan view, illustrates the support stand of FIG. 1.

FIGS. 1 to 42 inclusively illustrate various aspects of embodiments, according to the present invention, of a dismountable support stand 100. As seen in FIG. 3, the support stand 100 is usable for supporting either the front or rear wheel of a two-wheeled vehicle 500, referred to as a support wheel 502, so as to maintain the latter in a substantially upright attitude, or substantially vertically, by engaging the support wheel 502 and maintaining the support wheel 502 substantially vertical without the use of any additional support means. Referring more particularly to FIGS. 1, 2 and 6, the support stand 100 defines a longitudinal axis 102 extending horizontally longitudinally and centrally relative to the support stand 100.

Figure 8:
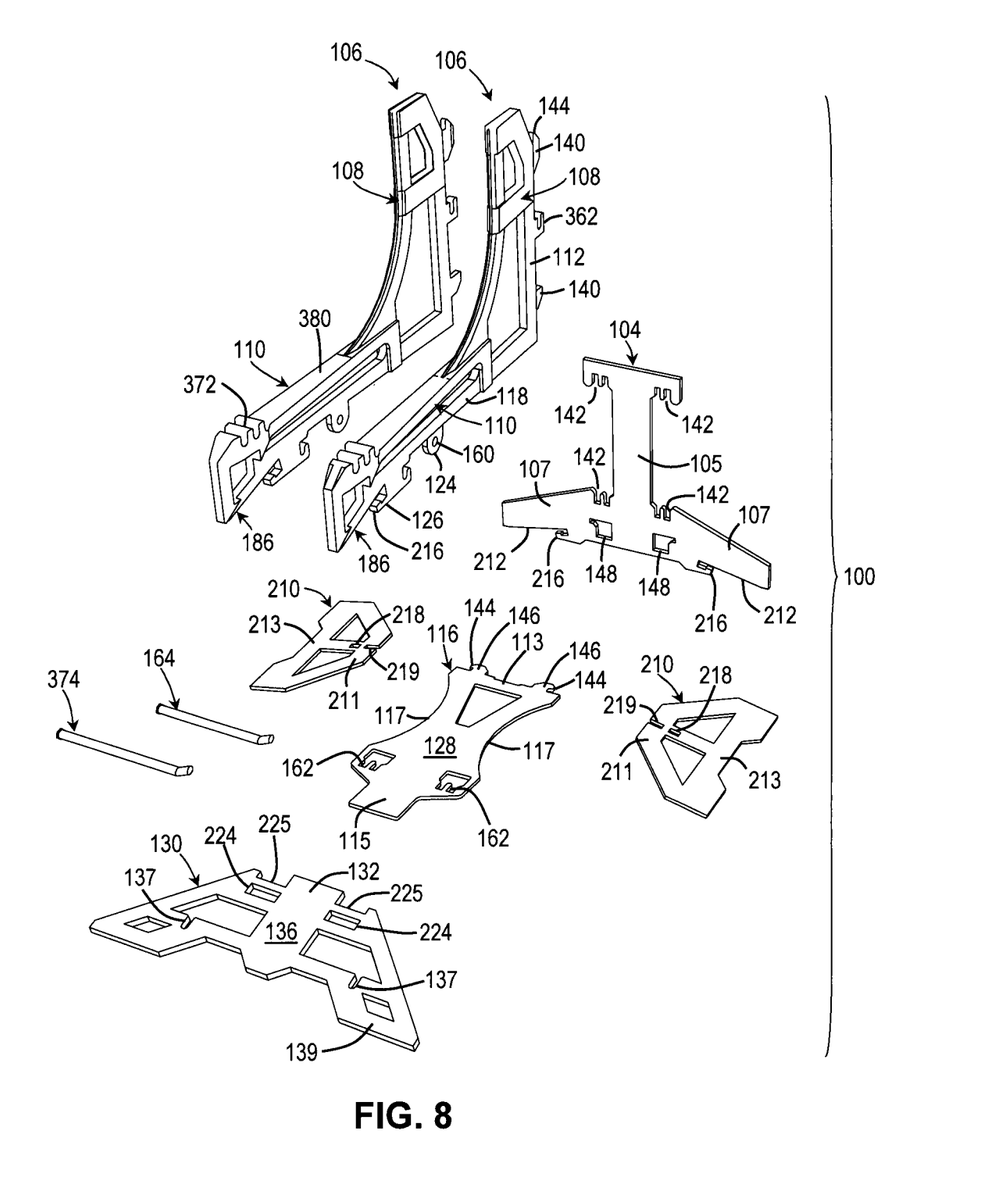
FIG. 8, in a perspective exploded view, illustrates the support stand of FIG. 1.
Figure 9:
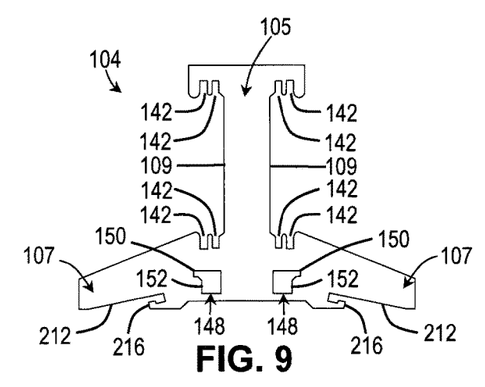
FIG. 9, in a plan view, illustrates a front element part of the support stand of FIG. 1.
Figure 10:
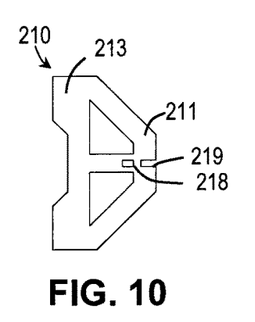
FIG. 10, in a plan view, illustrates a foot element part of the support stand of FIG. 1.
Figure 40:
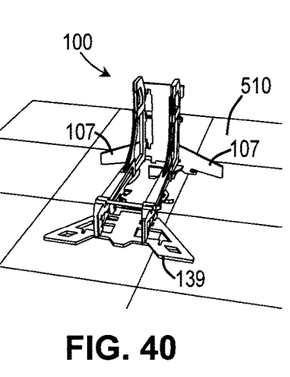
FIGS. 40 to 42 inclusively, illustrate the support stand of the present invention, here shown stably supported on a hard surface, on a soft ground and removably attached to the floor panel of a cargo bay.
Figure 41:
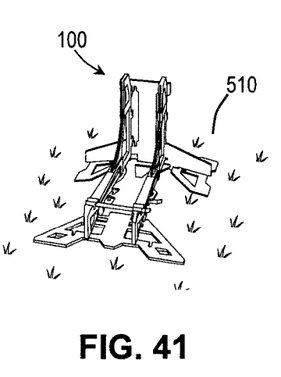

Referring more particularly to FIGS. 2, 8 and 9 collectively, the support stand 100 includes a front element 104 located at a forward end of the support stand 100 and typically having a substantially plate-like configuration. Typically, the front element 104 extends substantially vertically and transversally centrally relative to the stand longitudinal axis 102, but in alternative embodiments, the front element 104 is slanted relative to the vertical. The front element 104 defines a front element central portion 105, and a pair of front element lateral portions 107 extending substantially laterally distally therefrom. In some embodiments, the front element central portion 105 defines opposed central portion side edges 109 extending substantially parallelly vertically along a major vertical portion of the front element 104. Each of the front element lateral portions 107 defines a lower edge portion. In some embodiments, the lower edge portion is shaped and sized for stably resting on a substantially hard support surface 510, as illustrated in FIG. 40.

Figure 11:
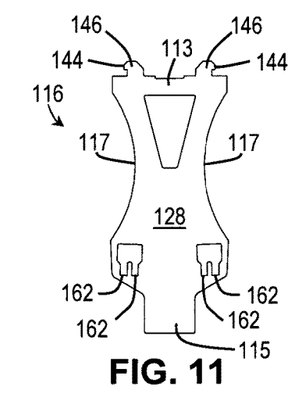
FIG. 11, in a plan view, illustrates a bottom element part of the support stand of FIG. 1.

Referring to FIGS. 1, 2, 8 and 11 collectively, the support stand 100 further includes a bottom element 116. Typically, the bottom element 116 has a substantially elongated plate-like configuration extending longitudinally and laterally centrally relative to the longitudinal axis 102. As best illustrated in FIGS. 8 and 11, the bottom element 116 defines longitudinally opposed bottom element forward and rearward edge portions 113 and 115 respectively, and laterally opposed bottom element side edge portions 117 extending therebetween. Furthermore, the bottom element 116 defines a wheel support surface 128 extending between the bottom element forward and rearward edge portions 113 and 115. The bottom element forward edge portion 113 is removably engaged with the front element central portion 105 through a first connection arrangement 114, so as to be supported in a spaced apart relationship above the support surface 510.

Figure 12:
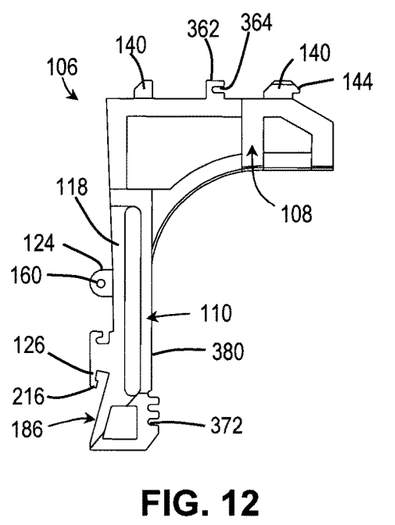
FIG. 12, in a plan view, illustrates a side element part of the support stand of FIG. 1.
Figures 13, 14:
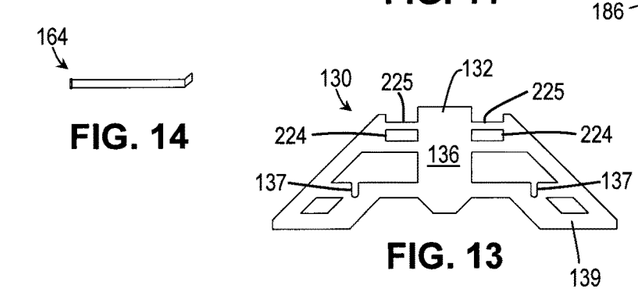
FIG. 13, in a plan view, illustrates a ramp element part of the support stand of FIG. 1.
FIG. 14, in a plan view, illustrates a bottom element lock pin part of the support stand of FIG. 1.

Referring to FIGS. 8 and 12, the support stand 100 further comprises a pair of side elements 106. Each one in the pair of side elements 106 typically has a substantially plate-like configuration extending longitudinally vertically in a laterally spaced apart relationship relative to one another, and on each side of the longitudinal axis 102, as best illustrated in FIGS. 1, 2, 4 and 6. The side elements 106 are for example substantially L-shaped. In this example, each side element 106 defines a side element forward portion 108 extending substantially vertically, and a side element rearward portion 110 extending substantially longitudinally rearwardly from a bottom portion of the side element forward portion 108. Furthermore, each side element 106 defines a side element lower edge portion 118, and a side element lower rear end portion 126. As best illustrated in FIGS. 2 and 8, each one in the pair of side elements 106 further defines a side element forward edge portion 112 in the side element forward portion 108 removably engaged with at a respective central portion side edge 109 of the front element 104 through a second connection arrangement 120, as seen in FIG. 1. Furthermore, as best illustrated in FIGS. 1, 2, 3 and 7, each one in the pair of side elements 106 further includes a side element lower edge portion 118 removably engaged with a respective bottom element side edge portion 117 through a respective third connection arrangement 129.

Referring to FIGS. 1, 2, 8 and 13 collectively, the support stand 100 further comprises a ramp element 130 located substantially longitudinally centrally and adjacently rearwardly relative to the bottom element 116. Typically, the ramp element 130 has a substantially plate-like configuration defining a ramp element forward edge portion 132 and a longitudinally opposed ramp element rearward edge portion 139. In some embodiments, the ramp element rearward edge portion 139 protrudes laterally outwardly relative to the side elements 106 and is suitably sized and configured for substantially stably abutting against the support surface 510 through ramp element feet portions for supporting the support stand 100 on the support surface 510, as illustrated in FIGS. 3 and 40 to 42 inclusively. The ramp element forward edge portion 132 is removably engaged with both side element lower rear end portions 126 through a fourth connection arrangement 134.

The first, second, third and fourth connection arrangements 114, 120, 124 and 134, respectively, are suitably adapted such that the bottom element 116 and side elements 106 are typically substantially stably supported in a spaced apart relationship above the support surface 510 through the front element lateral portions 107 and the ramp element rearward edge portion 139, as best illustrated in FIG. 40. As best illustrated in FIGS. 1, 2 and 6, the space defined by the adjacent surfaces of the front element 104, bottom element 116 and side elements 106 cooperatively form a wheel cradle 125 open ended upwardly and rearwardly relative to the support stand 100.

Furthermore, the ramp element 130 defines an access ramp surface 136 extending longitudinally centrally and substantially forwardly upwardly between the support surface 510 and the wheel support surface 128 of the bottom element 116, so as to cooperatively form a substantially continuous and longitudinally extending pathway surface to access the wheel cradle 125. The wheel cradle 125 is configured and sized for receiving in a forward rolling movement a peripheral tire portion 504 of the support wheel 502, as seen in FIG. 2.

The first, second, third and fourth connection arrangements 114, 120, 124 and 134 are toolless connection arrangements and the various components of the support stand 100 are secured to each other by mechanical interferences, which are typically devoid of fasteners. In other words, the shape of the various components of the support stand 100 allow to assemble the support stand and to interlock the components thereof to form a stable structure without the use of fasteners or hand tools. Thus, the support stand 100 may be completely assembled and disassembled by hand and in a relatively short period of time.

Furthermore, with the support stand 100 assembled and resting on a substantially hard support surface, the two-wheeled vehicle 500 may be operated such that its support wheel 502 is driven forwardly on the ramp element 130 followed with engaging the wheel cradle 125. Hence the two-wheeled vehicle 500 is rapidly and efficiently parked in a substantially stable upright attitude without the use of an additional means of support such as a deployable kick stand or the like.

Referring to FIGS. 2, 8, 9 and 11 collectively, in an embodiment of the support stand 100, according to the present invention, the first connection arrangement 114 includes one or more, for example a pair of, first connection protrusions 146 extending substantially longitudinally forwardly from the bottom element forward edge portion 113, and in a laterally spaced apart relationship relative to one another. In some embodiments, as best illustrated in FIG. 11, each first connection protrusions 146 terminates in a finger tip portion 144 extending substantially perpendicularly and laterally away relative to the other first connection protrusion 146 in the pair.

The first connection arrangement 114 further includes first connection aperture 148 in number equal to the number of first connection protrusions 146, with each first connection protrusion 146 engaging a respective first connection aperture 148. For example, the first connection arrangement includes a pair of first connection apertures 148. As best illustrated in FIG. 9, each one in the pair of first connection apertures 148 includes an upper portion 150 and a lower portion 152.

The upper portion 150 is suitably sized and shaped for freely receiving longitudinally there through a respective one of the first connection protrusions 146, including their respective finger tip portion 144. The lower portion 152 is suitably sized and shaped for freely receiving longitudinally therethrough a respective intermediate longitudinal portion of the respective first connection protrusion 146 extending between the bottom element forward edge portion 113 and the finger tip portion 144.

Thus, by first inserting the pair of first connection protrusions 146 forwardly through the upper portion 150 of the pair of first connection apertures 148, then lowering down the bottom element forward edge portion 113, the latter is removably supported by gravity and in a longitudinally locked relationship relative to the front element 104. Other similar first connection arrangements are also possible.

In some embodiments, the side elements 106 are securable to the front element 104 at a plurality of different laterally spaced apart distances from each other, which allows to customize the width of the support stand 100 to the width of the tire 504 of the support wheel 502 to properly support the latter. A specific embodiment of the second connection arrangement 120 described below allows to achieve this result without the use of complex mechanisms.

More specifically, referring to FIGS. 2, 8, 9 and 12 collectively, in an embodiment of the support stand 100, the second connection arrangement 120 includes for each side element 106 at least one second connection protrusion 140 extending substantially longitudinally forwardly from the side element forward edge portion 112 of each side element 106. In some embodiments, each side element 106 includes a pair of second connection protrusions 140 in a vertically spaced apart relationship relative to one another and further each extending substantially vertically. Furthermore, as best illustrated in FIG. 11, the uppermost protrusion in each pair of second connection protrusions 140 on a same side element 106 terminates at its free end in a finger tip portion 144 extending at least slightly upwardly.

The second connection arrangement 120 further includes at least two of second connection slots 142, for example two second connection slots 142 as shown in the drawings, defined along each central portion side edge 109 of the front element central portion 105 and extending substantially vertically. The second connection slots 142 are laterally parallelly spaced apart relative to each another. Further second connection slots 142 may also be provided vertically spaced apart from each of the previously described second connection slots 142 to define pairs of second connection slots 142. Each second connection slot 142 is suitably sized and shaped for engaging the pair of second connection protrusions 140 of a respective side element 106, wherein the finger tip portion 144 of the uppermost second connection protrusion 140 engages in a hook-like relation a surface portion proximally above the respective second connection slot 142 on the forward side of the front element 104. Thus, each side element 106 may be engaged in a respective pair of second connection slots 142 by, first engaging the finger tip portion 144 at a pivoted forward angle into the second connection slot 142.

As mentioned above, in some embodiments and as illustrated in FIGS. 8 and 9, each central portion side edge 109 defines two laterally parallelly spaced apart pairs of second connection slots 142. Other similar second connection arrangements are also possible. For example, each individual second connection slot 142 may be in the form of a slot aperture aperture extending through the plaque-like front element 104 instead of being simply a recess opening downwardly as illustrated in the drawings. Inserting the second connection protrusions 140 of each side element 106 in laterally spaced apart ones of the vertically spaced pairs of second connection slots 142 allows adjustment of the width of the wheel cradle 125. Typically, each second connection protrusion 140 is selectively and alternatively insertable in each of the second connection slots 142 substantially snugly so that when the second connection protrusion 140 is inserted in one of the second connection slots 142, the side element forward edge portion 112 is laterally static relative to the front element 104 As described further below, fine tuning of this width can be provided by having a lateral asymmetry in the second connection protrusions 140 relative to the remainder of the side elements 106 and by introducing means for slightly deforming the side elements 106 towards each other.

Referring to FIGS. 3, 7, 8, 11 and 12 collectively, in an embodiment of the support stand 100, the third connection arrangement 129 includes a third connection protrusion 124 protruding substantially downwardly from an intermediate longitudinal portion of the side element lower edge portion 118 of each side element 106. The third connection arrangement 129 further includes a third connection aperture 162 vertically extending throughout the bottom element 116 and located substantially laterally in register relative to each one of the pairs of second connection slots 142 defined in the front element 104, and longitudinally in register with the third connection protrusion 124 of the respective side element 106.

Figure 7:
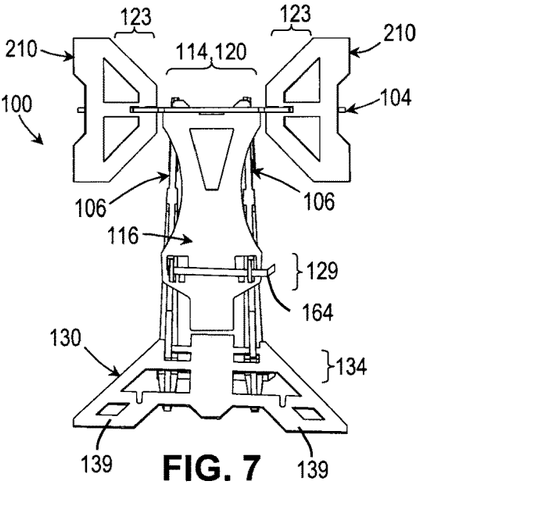
FIG. 7, in a bottom plan view, illustrates the support stand of FIG. 1.

In some embodiments, each side third connection protrusion 124 extends sufficiently downwardly through a respective one of the third connection apertures 162 so as to protrude underside the bottom element 116. Furthermore, each third connection protrusion 124 defines a side element locking aperture 160 extending transversally through the protruding portion thereof underside the bottom element 116. In such embodiments, the third connection arrangement 129 may further include a bottom element lock pin 164 configured and sized for removably extending laterally throughout both corresponding side element locking apertures 160 underside the bottom element 116, so as to lock the bottom element 116 with both side elements 106, as illustrated in FIGS. 1, 3 and 7.

As exemplified in FIG. 11, adjacent third connection apertures 162 near one bottom element side edge portion 117 may each have a respective forward end portion thereof joined to one another to form a common opening. In some embodiments, the support stand 100 comprises a single third connection arrangement 129 located substantially vertically in register under the axle of the wheel 502 engaged in the support stand 100. Thus, the bottom element 116 may substantially avoid being bent by the forward weight of a particularly heavy motorcycle. In other embodiments of the invention, the support stand 100 may comprise more than a single third connection arrangement 129 located in a longitudinally spaced apart relationship along the bottom element 116.

Thus, in the embodiments of the support stand 100 comprising more than one pair of second connection slots 142 on each side of the longitudinal axis 102, and a corresponding number of third connection apertures 162, each one in the pair of side elements 106 may be user selectively positioned at a desired lateral position in order to allow the tire mounted on the wheel 502 to substantially freely engage the wheel cradle 125 without excessive lateral friction.

Referring to FIGS. 1, 3, 8 and 13 collectively, in an embodiment of the support stand 100, the fourth connection arrangement 134 includes a fourth connection recess 186 provided in the side element bottom edge portion 118, for example extending substantially forwardly and at least slightly upwardly relative to the side element lower rear end portion 126. The fourth connection recess 186 is defined by a forward edge portion defining a relatively small L-shaped member 216 extending at least slightly rearwardly and upwardly relative to the fourth connection recess 186. The fourth connection arrangement recess 186 receives part of the ramp element 130 thereinto. In some embodiments, the fourth connection arrangement 134 further includes a pair of ramp element recesses 225 extending parallelly inwardly rearwardly relative to the ramp element forward edge portion 132, and equidistantly on each side of the longitudinal axis. The fourth connection arrangement 134 may further include a pair of ramp element apertures 224 extending through the plate-like ramp element 130. Each one in the pair of ramp element apertures 224 is located adjacently rearwardly relative to a respective one in the pair of ramp element recesses 225. The pair of ramp element recesses 225 and pair of ramp element apertures 224 are suitably configured and sized so as to extend substantially in register longitudinally and laterally with the pair of side element lower rear end portion 126 so as to encompass the various possible lateral positions of the side elements 106 permitted by the second connection slots 142 and third connection apertures 162.

The fourth connection arrangement 134 is realized by inserting the ramp element forward edge portion 132 forwardly upwardly into both side element fourth connection recesses 186 of the side element 106 such that a rearmost end portion of the L-shaped member 216 of each fourth connection recesses 186 engages a respective one in the pair of ramp element apertures 224, followed with resting the ramp element rearward edge portion 139 on the support surface 510. Thus, the side element lower rear end portion 126 of each side element 106 is supported at least slightly above the support surface 510 in a substantially counter-lever effect through the ramp element 130 extending at angle rearwardly distally and downwardly therefrom.

Referring to FIG. 8 for example, in some embodiments of the invention, the support stand 100 further comprises a pair of side foot elements 210. Each one in the pair of side foot elements 210 has typically a substantially plate-like configuration defining a side foot element proximal edge 211 and a side foot element distal edge 213. The side foot element proximal edge 211 is configured for removably engaging a respective one in the pair of front element lateral portions 107 through a fifth connection arrangement 123 to mount the foot element 210 to the front element lateral portion 107. The side foot element distal edge 213 is configured for substantially stably contacting a soft or hard support surface 510 such as sand, grass, gravel, concrete, asphalt or the likes. In a similar connection arrangement as the fourth connection arrangement 134, the fifth connection arrangement 117 includes a fifth connection arrangement recess 212 extending substantially laterally inwardly and at least slightly upwardly relative to a lower edge of each front element lateral portions 107. The fifth connection arrangement recess 212 includes an inner most edge portion defining a relatively small L-shaped member 216 extending at least slightly laterally outwardly and upwardly relative to the fifth connection arrangement recess 212. The fifth connection arrangement recess 212 receives part of one of the foot elements 210 thereinto, the front element lateral portion 107 being supported on top of the foot element 210.

In some embodiments, the fifth connection arrangement 117 further includes a side foot element recess 219 extending laterally inwardly centrally relative to the side foot element proximal edge 211 of each side foot element 210, and a side foot element aperture 218 extending through the plate-like side foot element 210 and laterally adjacently the side foot element recess 219. The fifth connection arrangement 117 is realized by inserting the side foot element proximal edge 211 of each side foot element 210 laterally inwardly and at least slightly upwardly into a respective one of the fifth connection arrangement recess 212 such that a laterally innermost end portion of the L-shaped member 216 of each fifth connection arrangement recess 212 engages a respective one of the side foot element apertures 218, followed with resting the side foot element distal edge 213 on the support surface 510. Thus, each front element lateral portions 107 is supported at least slightly above the support surface 510 in a substantially counter-lever effect through the side foot element 210 extending at angle laterally outwardly and downwardly therefrom.

Figure 42:
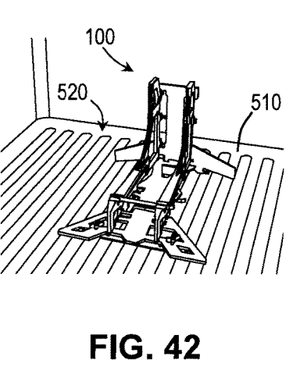

Referring to FIGS. 22 to 32 and 42 collectively, in some embodiments of the invention, the support stand 100 further includes a front bracket and a rear bracket each securable to the support surface, the support stand being removably mountable to the front and rear brackets so that the support stand 100 is immobilized relative to the front and rear brackets. For example, the support stand 100 further comprises a front floor bracket 300 and a rear floor bracket 350 usable for removably rigidly attaching the support stand 100 to the cargo floor 520 of a pick-up truck, a trailer, or the likes, as illustrated in FIG. 42.

Referring to FIGS. 25 to 30 collectively, the front floor bracket 300 includes a substantially L-shaped member 302 extending laterally relative to the support stand 100 when the latter is secured thereto. The L-shaped member 302 includes a rearward horizontal portion 304 adapted for coplanar attachment to the cargo floor 520 through, for example, bolt and nut combinations (not shown in the figures) extending through a plurality of spaced apart bolt apertures 306 defined through the rearward horizontal portion 304, or equivalent attachment. The L-shaped member 302 further includes a forward vertical portion 308 distally terminated with a pair of laterally spaced apart and forwardly extending thumbs 310, and a centered thumb 312 extending vertically therebetween.

Figure 22:
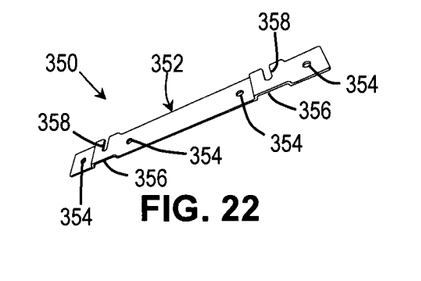
FIG. 22, in a perspective view, illustrates a rear floor bracket usable along with the support stand of FIG. 1.
Figure 23:
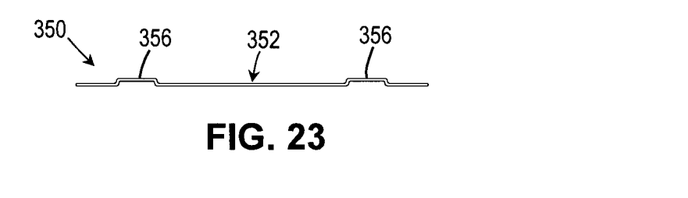
FIG. 23, in a side plan view, illustrates the rear floor bracket of FIG. 22.
Figure 24:
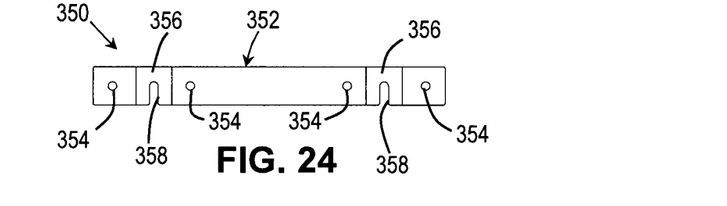
FIG. 24, in a top plan view, illustrates the rear floor bracket of FIG. 22.
Figure 25:
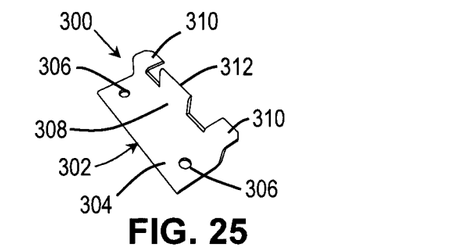
FIG. 25, in a perspective view, illustrates a front floor bracket usable along with the support stand of FIG. 1.
Figure 26:
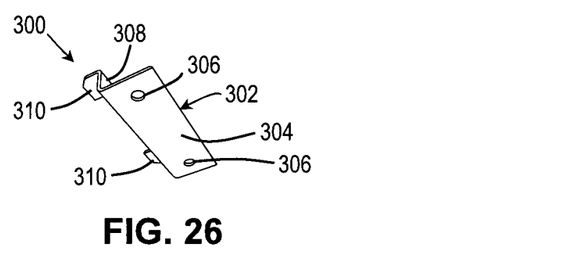
FIG. 26, in an alternative perspective view, illustrates the front floor bracket of FIG. 25.
Figure 27:
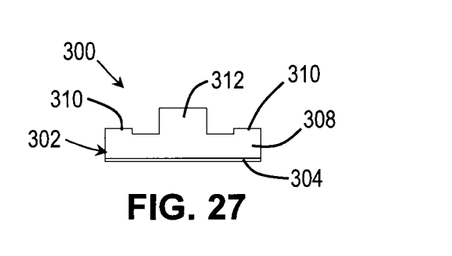
FIG. 27, in rear plan view, illustrates the front floor bracket of FIG. 25.
Figure 28:
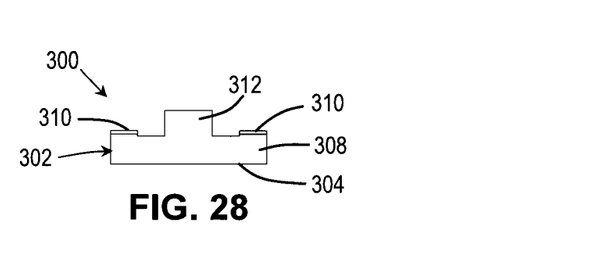
FIG. 28, in a front plan view, illustrates the front floor bracket of FIG. 25.
Figure 29:
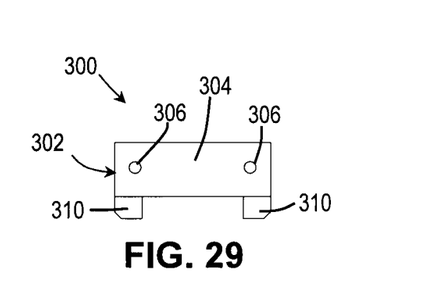
FIG. 29, in a top plan view, illustrates the front floor bracket of FIG. 25.
Figure 30:
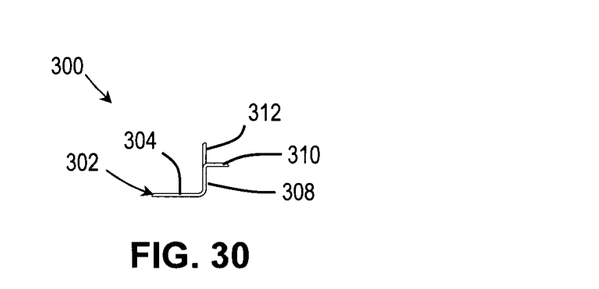
FIG. 30, in a plan view, illustrates the front floor bracket of FIG. 25.

Referring to FIGS. 22 to 24 inclusively, the rear floor bracket 350 includes a substantially elongated member 352 extending laterally and adapted for coplanar attachment to the cargo floor 520 through, for example, bolt and nut combinations (not shown in the figures) extending through a plurality of spaced apart bolt apertures 354 defined through the elongated member 352, or equivalent attachment. The rear floor bracket 350 further includes a pair of spaced apart coplanar segments 356 extending substantially parallelly upwardly relative to the general horizontal plane of the elongated member 352. Each coplanar segment 356 defines a rear floor bracket U-shaped recess 358 extending at least partially horizontally sidewardly inwardly relative to the elongated member 352.

Figure 31:
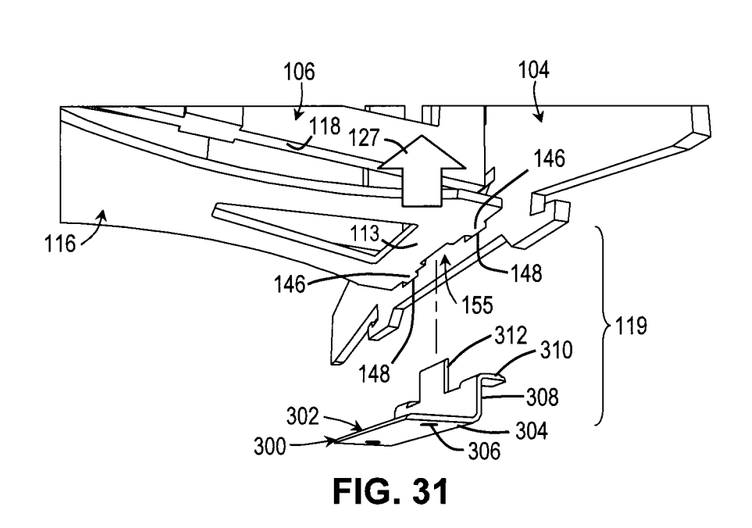
FIGS. 31, in an exploded perspective view, illustrates the assembly of the front floor bracket of FIG. 25.

Referring more particularly to FIG. 31, the front floor bracket 300 is removably engaged at a junction 155 between the front element 104 and the bottom element 116 through a sixth connection arrangement 119. The sixth connection arrangement 119 includes suitably sized and shaped side element lower edges 118 for allowing the bottom element forward edge portion 113 to be pivoted upwardly, as indicated by the up arrow 127 on FIG. 31, relative to the third connection arrangement 129 (as best illustrated in FIG. 3) and within the first connection apertures 148. The sixth connection arrangement 119 further includes that each of the forwardly extending thumbs 310 of the front floor bracket 300 is located between a lower edge portion of a respective first connection aperture 148 and first connection protrusion 146 engaged therein, with the centered thumb 312 located between the first connection protrusions 146 and the front element 104.

Figure 32:
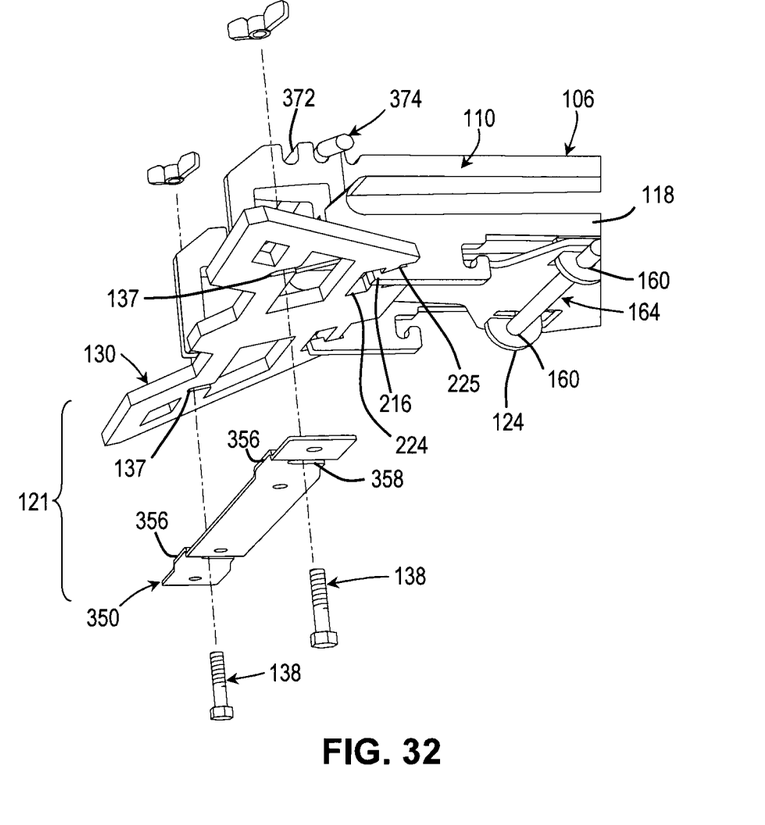
FIGS. 32, in an exploded perspective view, illustrates the assembly of the rear floor bracket of FIG. 22.

Referring more particularly to FIG. 32, the rear floor bracket 350 is removably engaged with the ramp element 130 through a seventh connection arrangement 121. The seventh connection arrangement 121 includes a pair of ramp element U-shaped recesses 137. Each one of the ramp element U-shaped recesses 137 extends at least partially coplanarly inwardly relative to a respective lateral edge portion of the ramp element 130 and equidistantly on each side of the longitudinal axis 102. Each one in the pair of ramp element U-shaped recesses 137 is laterally spaced apart from one another a distance that is equivalent to the distance between the pair of rear floor bracket U-shaped recesses 358. The seventh connection arrangement 121 further includes a pair of bolt and wing nut combinations 138 suitably sized and shaped to link each rear floor bracket U-shaped recesses 358 with a respective ramp element U-shaped recess 137, wherein the head of the bolt is embedded under the coplanar segment 356 and the wing nut threadedly engaged with the thread of the bolt from above the ramp element 130.

Thus, with the front and rear floor brackets 300 and 350 rigidly connected to to the cargo floor 520 at suitable locations in register below the junction 155 and ramp element 130, the rest of the assembled support stand 100 may be substantially easily and quickly removably engaged with the front and rear floor brackets 300 and 350. To achieve the sixth and seventh connection arrangements 119 and 121, the bottom element forward edge portion 113 is momentarily pivoted upwardly so as to allow the engagement of the forwardly extending thumbs 310 of the front floor bracket 300 to engage their respective first connection aperture 148, followed with the centered thumb 312 being inserted between the bottom element 116 and the front element 104 as the bottom element forward edge portion 113 is lowered down. Subsequently, the ramp element 130 is rigidly attached to the rear floor bracket 350 using the pair of bolt and wing nut combinations 138 engaged in vertically corresponding ramp element U-shaped recesses 137 and the rear floor bracket U-shaped recesses 358. Hence, the cargo floor 520 of a pick-up truck or trailer may conveniently be relatively quickly converted to transport a motorcycle 500 engaged in the support stand 100 and secured with tie straps, or to transport other large goods without being annoyed by the presence of a support stand.

As mentioned hereinabove, fine tuning of the lateral distance between the side elements 106 can be provided without requiring a very large number of second connection slots 142 provided close to each other. To that effect, in some embodiments, the side elements 106 are mirror images of each other and the second connection protrusions 140 are laterally asymmetrically configured relative to the side elements 106 so that switching the side elements 106 with each other while using the same second connection slots 142 to attach the side elements 106 to the front element 104 results in a change in spacing between the side elements 106. For example, this is achieved by having second connection protrusions 140 that thinner than the remainder of the side element frontward edge portions 118 and laterally offset relative to a midplane of the side element frontward edge portions 118.

More specifically, for example and referring more particularly to FIGS. 12, 16, 20 and 34 collectively, in some embodiments of the invention, the second and third connection protrusions 140 and 124 of the pair of side elements 106 all have a transversal thickness that is relatively smaller than the transversal thickness of the rest of the plate like configuration of each side element 106. Furthermore, all of the second and third connection protrusions 140 and 124 of a first side element 106 in the pair have a same side surface 141 in register with one side surface of this first side element 106, while all of the second and third connection protrusions 140 and 124 of the second side element 106 in the pair have a same side surface 141 in register with the other side surface thereof relative to the first side element 106. In other words, each side element 106 in the pair is a transversal mirror image of the other.

Thus, in the embodiment shown in the drawings and as shown partially in FIGS. 36 to 39, up to six (6) distinct transversal distance values may be achieved between the pair of side elements 106 by varying the position of each side element 106 relative to the number of pairs of second connection slots 142 and third connection apertures 162, and also by interchanging each side element 106 with the other. Consequently, without the use of a hand tool, the support stand 100 may be user selectively configured for compatibility with a relatively large number of standard tire widths compared with known support stands of the prior arts.

Figure 35:
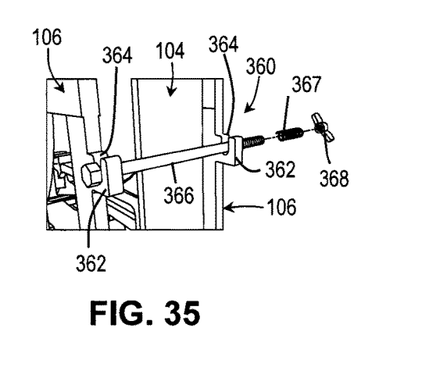
FIG. 35 in a partial front perspective view, illustrates the support stand, here showing a lateral adjustment element thereof.
Figure 36:
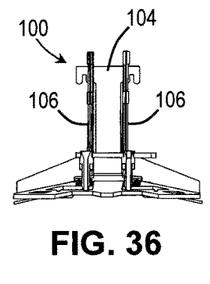
FIGS. 36 to 39, illustrate the support stand of FIG. 1 with the side elements thereof at various lateral locations relative to one another and to the support stand, allowing adjustment of the distance between the side elements.
Figure 37:
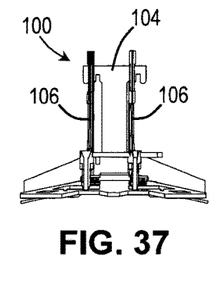
Figure 38:
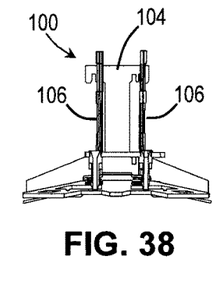
Figure 39:
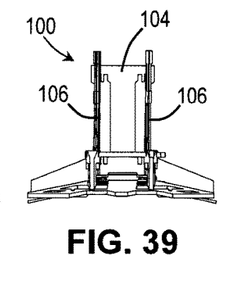

Referring more particularly to FIG. 35, in some embodiments of the invention, the support stand 100 further comprises a width clamp 360 adapted for user selectively applying oppositely inwardly directed pressure forces on opposite side portions of each side element 106. Thus, a user may fine adjust the lateral friction level of engagement of the wheel cradle 125 on the tire sidewalls of the support wheel 502 engaged therein. For example, the width clamp 360 includes a pair of clamp protrusions 362 extending substantially centrally forwardly from each side element forward edge portion 112, with each clamp protrusion 362 defining a U-shaped recess 364 extending inwardly downwardly and transversally from an upper surface thereof. The width clamp 360 further includes a bolt 366, spring 367 and wing nut 368 combination, transversally engaged in the U-shaped recess 364, with the spring 367 engaged on the bolt 366, between the wing nut 368 and the adjacent clamp protrusions 362.

Referring more particularly to FIG. 3, in some embodiments, the support stand 100 is configured and sized such that the ramp element 130 extends forwardly upwardly at a predetermined ramp angle of between 5 and 15 degrees relative the longitudinal axis 102. For example, the predetermined ramp angle is roughly 12 degrees. Still referring to FIG. 3, in some embodiments, the support stand 100 is configured and sized such that the bottom element 116 extends forwardly downwardly at a predetermined bottom element angle of between 0 and 10 degrees relative the longitudinal axis 102. For example, the predetermined bottom element angle is roughly 3 degrees.

Figures 33, 34:
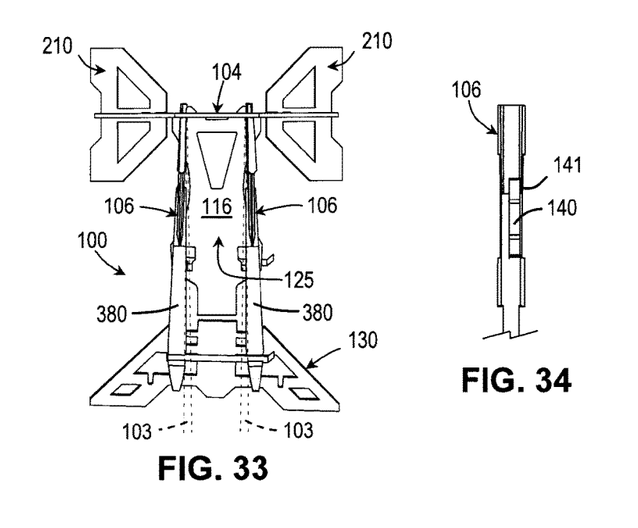
FIG. 33 in a top plan view, illustrates the support stand of GIF. 1, here showing the relative angle between the side elements thereof.
FIG. 34 in a partial front elevational view, illustrates an upper portion of the side element, here showing a transversal offset alignment of a connection protrusion relative to the otherwise planar configuration of the side element.

Referring more particularly to FIG. 33, the support stand 100 is configured and sized such that the oppositely facing, innermost longitudinal side surface portions of each side element 106 extend substantially longitudinally relative to the longitudinal axis 102 at a predetermined side element inner angle 103 of between 0 and 5 degrees. For example, the predetermined angle is roughly 1.5 degree such that the rearward ends of the pair of side elements 106 are slightly more open relative to the forward ends thereof. Thus, the forward alignment and engagement of the support wheel 502 in the wheel cradle 125 is significantly facilitated.

Referring to FIGS. 1, 2, 3 and 8, in some embodiments of the invention, the support stand 100 further comprises a wheel stop 370 adapted for user selectively prevent the support wheel 502 engaged in the wheel cradle 125 from inadvertently backing out from therein. For example, the wheel stop 370 includes a series of laterally in register U-shaped recesses 372 extending downwardly and transversally relative to an upper edge portion of each side element 106 that is substantially in register above the respective side element lower rear end portion 126 thereof. The wheel stop 370 further includes a stop bar 374 suitably sized and configured for user selectively engaging a transversally corresponding pair of U-shaped recesses 372.

Figure 15:
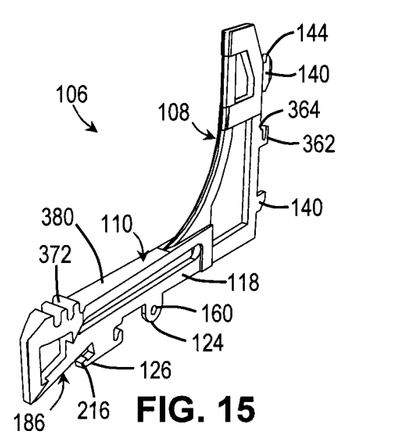
FIG. 15, in a perspective view, illustrates the side element of FIG. 12.
Figure 16:
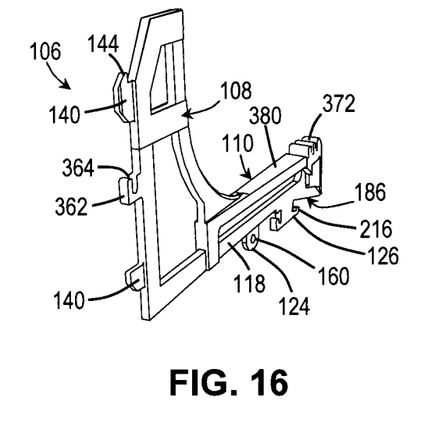
FIG. 16, in an alternative perspective view, illustrates the side element of FIG. 12.
Figure 17:
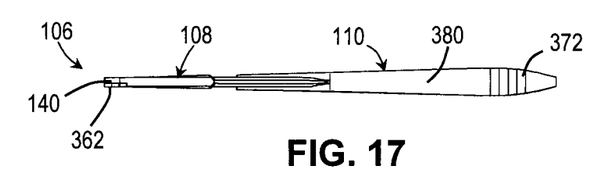
FIG. 17, in a top view, illustrates the side element of FIG. 12.
Figure 18:
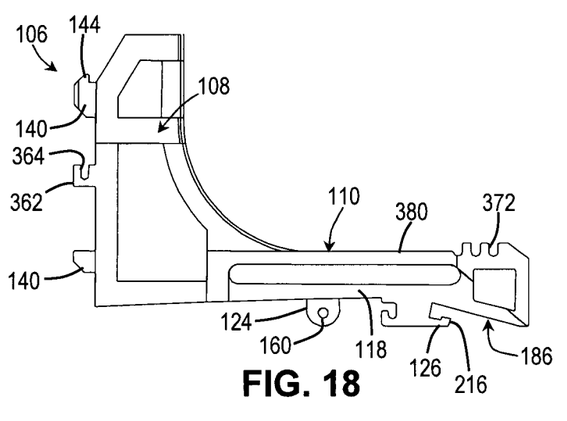
FIG. 18, in a side view, illustrates the side element of FIG. 12.
Figure 19:
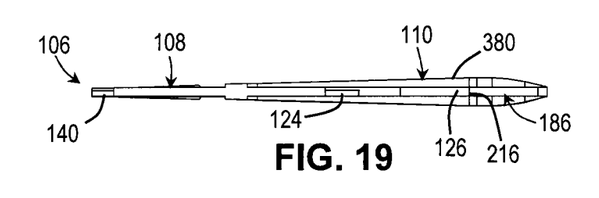
FIG. 19, in a bottom view, illustrates the side element of FIG. 12.
Figure 20:
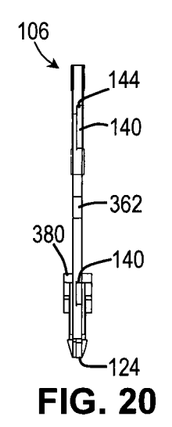
FIG. 20, in a front view, illustrates the side element of FIG. 12.
Figure 21:
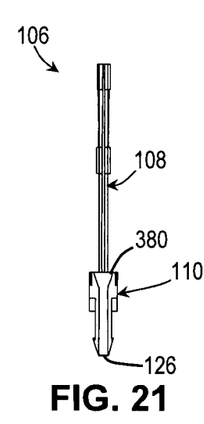
FIG. 21, in a rear view, illustrates the side element of FIG. 12.

Referring to FIGS. 15, 16 and 17, in some embodiments of the invention, each side element 106 further includes a relatively wider or reinforced upper longitudinal edge portion 380 along the side element rearward portion 110. The reinforced upper longitudinal edge portion 380 defines a transversally wider edge at a rearward end thereof that is gradually tapering forwardly therefrom as it approaches a junction with the side element forward portion 108.

In some embodiments, as best illustrated in FIGS. 9 to 13 inclusively, the plate-like elements of the invention define suitably sized, shaped and distributed apertures extending therethrough for further reducing the overall weight of the support stand 100, yet maintaining its assembled structural rigidity.

In some embodiments, as best illustrated in FIGS. 6 and 7, the forward and rearward end portions of the assembled support stand 100 each have a substantially equivalent same width dimension, so that the sustentation polygon of the support stand 100 is a rectangle.

One method of assembling the support stand 100 will now be described. In a first step, the bottom element 116 is engaged with the front element 104 through the first connection arrangement 114. In a second step, the pair of side elements 106 are engaged at a user selected cradle width with the front element 104 through the second connection arrangement 120. A third step includes lifting upwardly and engaging at the user selected cradle width the bottom element 116 with both side elements 106 through the third connection arrangement 129. Once this step is completed, the lock pin 164 included in the third connection arrangement 129 secures together the assembly of the four elements represented by the front element 104, the bottom element 116 and both side elements 106. This assembly can then be relatively easily transported by hand to another location in order to proceed with the remaining steps of the method. At this point, this assembly is typically relatively light, for example between about 10 and about 25 pounds in some embodiments for a support stand 100 made of suitable aluminum plates configured to support a relatively large motorcycle 500.

Subsequently, a fourth step includes engaging the ramp element 130 with the pair of side elements 106 through the fourth connection arrangement 134. In some embodiments, a fifth step includes tightening the width clamp 360 of the support stand to a user selected level of friction engagement between the side elements 106 and opposed tired sidewall portions 503 of the support wheel 502. In some embodiments, a sixth step includes engaging each one in the pair of side foot elements 210 with a respective front element lateral portion 107 of the front element 104 through the fifth connection arrangement 117. Alternatively to the previously described sixth step, the sixth step may include engaging the front and rear floor brackets 300 and 350 with the front element 104 and ramp element 130 respectively, through the sixth and seventh connection arrangements 119 and 121 respectively. It is to be noted that the order of the first four steps described above may be modified to achieve the assembly of the support stand 100.

The various elements of the support stand 100 described above are for example manufactured out a one-piece aluminum plate-like member having sufficient rigidity and thickness characteristics proportionate to the weight and size of the two-wheeled vehicle 500 it is designed to support. These elements may be formed or cut out using any known manufacturing or cutting processes such as, for example, waterjet, laser, CNC, punch press and injection molding, or a combination thereof. Other suitable material or materials used in the assembly of the support stand 100 are also possible such as, non limitatively, a suitable polymeric material, stainless steel, fiberglass, carbon fiber, wood, or a combination thereof.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A support stand for a two-wheeled vehicle, one wheel of the two-wheeled vehicle being a support wheel, the support stand being positionable on a support surface for supporting the two-wheeled vehicle substantially vertically by engaging the support wheel and maintaining the support wheel substantially vertical, the support stand defining a stand longitudinal axis, the support stand comprising:
 a front element defining a front element central portion and a pair of front element lateral portions extending laterally outwardly therefrom;
 a bottom element defining longitudinally opposed bottom element forward and rearward edge portions and laterally opposed bottom element side edge portions extending between the bottom element forward and rearward edge portions, the bottom element defining a wheel support surface between the bottom element forward and rearward edge portions, the bottom element forward edge portion being removably engaged with the front element central portion through a first connection arrangement so as to be supported above the support surface spaced apart therefrom;
 first and second side elements provided in a laterally spaced apart relationship relative to each other and extending rearwardly from the front element, the first and second side elements each defining a respective side element forward edge portion removably engaged with the front element central portion through a second connection arrangement and a respective side element lower edge portion removably engaged with a respective one of the bottom element side edge portions through a respective third connection arrangement; and
 a ramp element extending substantially longitudinally and rearwardly relative to the bottom element, the ramp element defining a ramp element forward edge portion and a longitudinally opposed ramp element rearward edge portion, the ramp element rearward edge portion being sized and configured for abutting against the support surface, the ramp element forward edge portion being removably engaged with the respective side element lower edge portion through a fourth connection arrangement;
 wherein the front element, bottom element and first and second side elements cooperatively form a wheel cradle opened upwardly and rearwardly for receiving in a forward rolling movement the support wheel; and
 wherein the first, second, third and fourth connection arrangements are toolless connection arrangements in which the front, first side, second side, bottom and ramp elements are secured to each other by their respective connection arrangements by mechanical interferences.

2. The support stand as defined in claim 1, wherein the mechanical interferences are devoid of fasteners.

3. The support stand as defined in claim 1, wherein the front, bottom, first side, second side and ramp elements are substantially planar plate-shaped.

4. The support stand as defined in claim 1, wherein the first and second side elements are securable to the front element at a plurality of different laterally spaced apart distances from each other.

5. The support stand as defined in claim 4, wherein the second connection arrangement includes at leak two substantially parallel and vertical second connection arrangement slots formed in the front element central portion at laterally spaced apart locations from each other and a respective substantially vertical second connection arrangement protrusion defined by the forward edge portion of the first and second side elements, the second connection arrangement protrusion being selectively and alternatively insertable in each of the second connection arrangement slots substantially snugly so that when the second connection arrangement protrusion is inserted in one of the second connection arrangement slots, the respective side element forward edge portion is laterally static relative to the front element.

6. The support stand as defined in claim 5, wherein the first and second side elements are mirror images of each other, and wherein the second connection arrangement protrusion is laterally asymmetrically configured relative to the first and second side elements so that switching the first and second side elements with each other while using the same second connection arrangement slots to attach the first and second side elements to the front element results in a change in spacing between the first and second side elements.

7. The support stand as defined in claim 6, wherein the second connection arrangement protrusions are thinner than the remainder of the first and second side element forward edge portions and laterally offset relative to a midplane of the first and second side element forward edge portions.

8. The support stand as defined in claim 4, wherein the second connection arrangement includes at least two substantially parallel and vertical second connection arrangement slot pairs formed in the front element central portion at laterally spaced apart locations from each other, the second connection arrangement slot pairs each including two vertically spaced apart second connection arrangement slots, the second connection arrangement further including a pair of substantially vertical second connection arrangement protrusions defined by the forward edge portion of the first and second side elements substantially vertically spaced apart from each other, the second connection arrangement protrusions being selectively and alternatively insertable in each of the second connection arrangement slot pairs substantially snugly so that when the second connection arrangement protrusions are inserted in the second connection arrangement slots, the respective side element forward edge portion is laterally static relative to the front element.

9. The support stand as defined in claim 1, wherein the first, second, third and fourth connection arrangements are configured and sized so that the bottom element and the first and second side elements are substantially stably supported in a spaced apart relationship above the support surface through the front element lateral portions and the ramp element rearward edge portion when the support stand is operationally positioned over the support surface.

10. The support stand as defined in claim 1, wherein the ramp element rearward edge portion protrudes laterally outwardly relative to the first and second side elements and defines a pair of laterally spaced apart ramp element feet portions for supporting the support stand on the support surface.

11. The support stand as defined in claim 1, further comprising a pair of foot elements each mountable to a respective one of the front element lateral portions for supporting the front element on the support surface through a toolless fifth connection arrangement.

12. The support stand as defined in claim 11 wherein the foot elements are substantially planar plate-shaped, the fifth connection arrangement including a fifth connection arrangement recess provided at a front element bottom edge portion of the front element and receiving part of one of the foot elements thereinto, the front element lateral portion being supported on top of the respective foot element.

13. The support stand as defined in claim 1, wherein the fourth connection arrangement includes a fourth connection arrangement recess provided in each side lower edge portion, the fourth connection arrangement recess receiving part of the ramp element thereinto, the first and second side elements being in part supported on top of the ramp element.

14. The support stand as defined in claim 1, wherein the first connection arrangement includes a first connection protrusion extending from the bottom element forward edge portions engaged in a first connection aperture defined in the front element central portion.

15. The support stand as defined in claim 1, wherein the third connection arrangement includes a third connection arrangement protrusion protruding downwardly from each side element lower edge portion engaged in a third connection arrangement aperture defined in and extending through one of the bottom element side edge portions.

16. The support stand as defined in claim 15, wherein the third connection arrangement protrusion protrudes downwardly from the bottom element, the third connection arrangement protrusion defining a third connection arrangement protrusion aperture extending laterally therethrough, the third connection arrangement further comprising a lock pin extending through the third connection arrangement protrusion aperture and preventing removal of the third connection arrangement protrusion from the third connection arrangement aperture.

17. The support stand as defined in claim 1, further comprising a wheel stop extending between the first and second side elements above the ramp.

18. The support stand as defined in claim 1, further comprising a front bracket and a rear bracket each securable to the support surface, the support stand being removably mountable to the front and rear brackets so that the support stand is immobilized relative to the front and rear brackets.

19. The support stand as defined in claim 1, further comprising a width clamp adapted for user selectively applying oppositely inwardly directed pressure forces on the first and second side elements.

20. The support stand as defined in claim 1, wherein the first and second side elements are angled at an angle of about 10 degrees or less relative to each other and converge towards each other in a direction leading towards the front element.

* * * * *